United States Patent
Fujino

(10) Patent No.: US 11,054,441 B2
(45) Date of Patent: Jul. 6, 2021

(54) SCANNING PROBE MICROSCOPE AND POSITION ADJUSTMENT METHOD FOR SCANNING PROBE MICROSCOPE

(71) Applicant: Shimadzu Corporation, Kyoto (JP)

(72) Inventor: Keita Fujino, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/995,416

(22) Filed: Aug. 17, 2020

(65) Prior Publication Data

US 2021/0102971 A1 Apr. 8, 2021

(30) Foreign Application Priority Data

Oct. 8, 2019 (JP) .............................. JP2019-185295

(51) Int. Cl.
*G01Q 20/02* (2010.01)

(52) U.S. Cl.
CPC .................. *G01Q 20/02* (2013.01)

(58) Field of Classification Search
CPC ........ G01Q 10/00; G01Q 10/02; G01Q 10/04; G01Q 10/045; G01Q 10/06; G01Q 10/065; G01Q 20/00; G01Q 20/02; G01Q 20/04
USPC ..................... 850/1, 2, 3, 4, 5, 6, 7
See application file for complete search history.

(56) References Cited

U.S. PATENT DOCUMENTS

| | | | | |
|---|---|---|---|---|
| 10,126,325 B2* | 11/2018 | Nagai | .................... | G01Q 30/04 |
| 2002/0104963 A1* | 8/2002 | Mancevski | ............ | B82Y 35/00 250/306 |
| 2008/0266575 A1* | 10/2008 | Gaitas | .................... | B82Y 35/00 356/600 |
| 2011/0061452 A1* | 3/2011 | King | ..................... | G01Q 60/32 73/105 |
| 2016/0187374 A1* | 6/2016 | Yamaguchi | ............ | G01H 17/00 850/5 |
| 2019/0293681 A1* | 9/2019 | Shigeno | ................. | G01Q 30/02 |
| 2020/0355724 A1* | 11/2020 | Juedes | ................... | G01Q 20/02 |

FOREIGN PATENT DOCUMENTS

JP 2000-346782 A 12/2000

\* cited by examiner

*Primary Examiner* — Nicole M Ippolito
(74) *Attorney, Agent, or Firm* — Muir Patent Law, PLLC

(57) ABSTRACT

A laser beam adjustment unit adjusts a laser beam applied to a cantilever. Assuming that a direction of displacement of a spot of the laser beam on a light receiving surface when the cantilever is displaced during measurement of properties of a sample is defined as a first direction, and a direction orthogonal to the first direction on the light receiving surface is defined as a second direction, the laser beam adjustment unit adjusts the laser beam such that a length of the spot of the laser beam in the second direction during adjustment of a position of a detection unit is longer than a length of the spot of the laser beam in the first direction during measurement of the properties of the sample.

11 Claims, 14 Drawing Sheets

SCANNING PROBE MICROSCOPE AND POSITION ADJUSTMENT METHOD FOR SCANNING PROBE MICROSCOPE

BACKGROUND OF THE INVENTION

Field of the Invention

The present invention relates to a scanning probe microscope and a position adjustment method for a scanning probe microscope.

Description of the Background Art

A cantilevered beam, which is called "cantilever", including a probe is used in a scanning probe microscope. In the scanning probe microscope, a change in warpage or vibration of the cantilever is converted into a change in a reflected beam of a laser beam applied to a rear surface of the cantilever, and is detected by a photodetector. The photodetector detects a change in position, intensity, phase and the like of the reflected beam, and converts the change into various pieces of physical information (refer to, for example, Japanese Patent Laying-Open No. 2000-346782).

SUMMARY OF THE INVENTION

The scanning probe microscope requires adjustment of a position of the photodetector before measurement of a sample, such that the reflected beam from the cantilever enters the photodetector correctly and a spot of the reflected beam is located at the center of the photodetector. The adjustment of the position of the photodetector is performed every time the cantilever is replaced, and thus, it is desirable to perform the adjustment in a short time.

Generally, the scanning probe microscope is configured to, in the adjustment of the position of the photodetector, estimate a direction of the photodetector with respect to the reflected beam based on an incident position of the reflected beam and move the photodetector in that direction, when at least a part of the reflected beam enters the photodetector.

However, when the reflected beam enters the outside of the photodetector, the direction of the photodetector with respect to the reflected beam cannot be estimated. That is, it cannot be determined in which direction the photodetector should be moved to allow the reflected beam to enter the photodetector. Therefore, it is necessary to randomly move the photodetector until the reflected beam enters the photodetector, which leads to a longer time for the adjustment of the position of the photodetector.

Accordingly, an object of the present invention is to provide a scanning probe microscope and a position adjustment method for a scanning probe microscope that can reduce the time required for adjustment of a position of a photodetector.

A scanning probe microscope according to an aspect of the present invention includes: a cantilever; an irradiation unit; a detection unit; a driving unit; a measurement unit; and a laser beam adjustment unit. The cantilever has a probe at a tip thereof. The irradiation unit irradiates the cantilever with a laser beam. The detection unit includes a light receiving surface for receiving the laser beam reflected from the cantilever, and detects a spot of the laser beam on the light receiving surface. The driving unit adjusts a position of the detection unit. The measurement unit measures properties of a sample based on displacement of the cantilever calculated from displacement of the spot of the laser beam on the light receiving surface. The laser beam adjustment unit adjusts the laser beam applied to the cantilever. Assuming that a direction of displacement of the spot of the laser beam on the light receiving surface when the cantilever is displaced during measurement of the properties of the sample is defined as a first direction, and a direction orthogonal to the first direction on the light receiving surface is defined as a second direction, the laser beam adjustment unit adjusts the laser beam such that a length of the spot of the laser beam in the second direction during adjustment of the position of the detection unit is longer than a length of the spot of the laser beam in the first direction during measurement of the properties of the sample.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
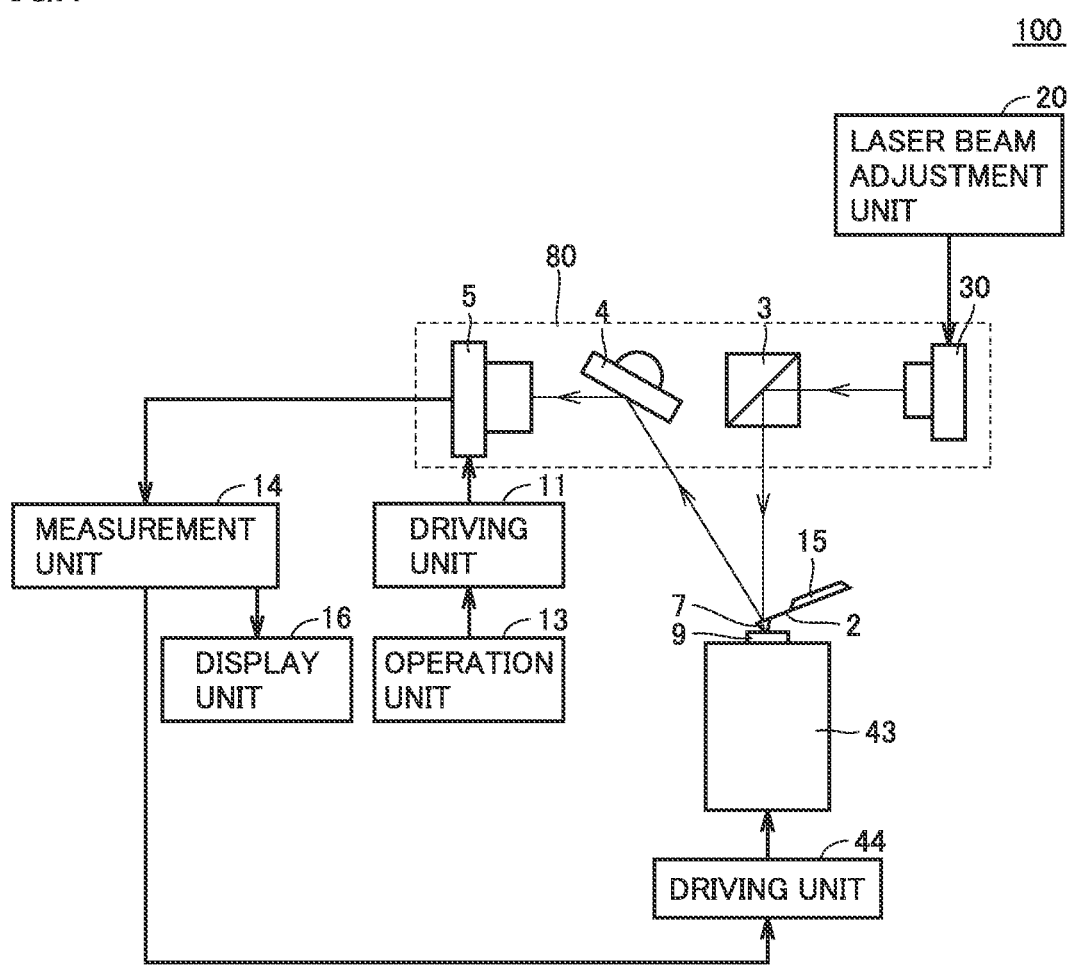
FIG. 1 is a schematic view showing a configuration of a scanning probe microscope according to a first embodiment.

Embodiments of the present invention will be described in detail hereinafter with reference to the drawings, in which the same or corresponding portions are designated by the same reference characters and description thereof will not be repeated in principle.

First Embodiment

FIG. 1 shows a configuration of a scanning probe microscope 100 according to a first embodiment.

Referring to FIG. 1, scanning probe microscope 100 according to the first embodiment includes an optical system 80, a cantilever 2, a measurement unit 14, driving units 11 and 44, a scanner 43, a laser beam adjustment unit 20, and an operation unit 13.

Cantilever 2 has a probe 7 at a tip, which is a free end of a surface. A sample 9 is arranged on scanner 43 so as to face probe 7. Cantilever 2 is displaced by the atomic force (attractive force or repulsive force) between probe 7 and sample 9.

Optical system 80 applies a laser beam to a rear surface of cantilever 2 and detects a laser beam reflected from the rear surface of cantilever 2. Optical system 80 can detect displacement caused by deflection of cantilever 2. Optical system 80 includes a laser beam source 30, a beam splitter 3 as a first mirror, a reflecting mirror 4 as a second mirror, and a photodetector 5.

Laser beam source 30 is composed of a laser oscillator that emits a laser beam, a collimate lens, a focus lens and the like. Photodetector 5 is composed of a photodiode that detects an incident laser beam, and the like. A laser beam emitted from laser beam source 30 is reflected by beam splitter 3 and enters cantilever 2. Laser beam source 30 and beam splitter 3 correspond to one example of "irradiation unit".

The laser beam is reflected by cantilever 2, is further reflected by reflecting mirror 4, and enters a light receiving surface 50 of photodetector 5. When cantilever 2 is displaced, a position of the laser beam entering light receiving surface 50 of photodetector 5 is also displaced. That is, scanning probe microscope 100 can measure displacement of cantilever 2 based on displacement of a spot of the laser beam on light receiving surface 50 of photodetector 5. Photodetector 5 corresponds to one example of "detection unit". Hereinafter, the spot of the laser beam will also be simply referred to as "spot" or "laser spot".

Laser beam adjustment unit 20 adjusts a size, a shape, an intensity and the like of the spot of the laser beam to be emitted from laser beam source 30, by adjusting the collimate lens and the focus lens of laser beam source 30.

Measurement unit 14 calculates a position of the laser beam entering photodetector 5, based on a detection signal of the laser beam detected by optical system 80. Measurement unit 14 measures properties of sample 9 based on displacement of cantilever 2 obtained from a change in the calculated position of the laser beam. For example, measurement unit 14 creates a force curve or the like indicating a change over time in acting force, based on a change over time in displacement of cantilever 2. Measurement unit 14 transmits a control signal for driving scanner 43 to driving unit 44.

A display unit 16 displays a result of calculation and a result of measurement by measurement unit 14. Display unit 16 displays a position of the laser spot in photodetector 5, for example. Display unit 16 is implemented by, for example, a liquid crystal display.

Driving unit 11 is a mechanism for adjusting a position of photodetector 5. Driving unit 11 is implemented by, for example, a screw.

Operation unit 13 is used when an analyst drives driving unit 11. Operation unit 13 is implemented by, for example, an adjusting screw.

Display unit 16, driving unit 11 and operation unit 13 are used to perform an adjustment such that the laser beam enters photodetector 5 appropriately, before starting measurement of the sample. Specifically, the analyst operates operation unit 13 while checking the position of the laser spot in photodetector 5 displayed on display unit 16, to thereby move driving unit 11 and adjust the position of photodetector 5.

Driving unit 44 drives scanner 43, to thereby change a relative positional relationship between sample 9 placed on scanner 43 and probe 7.

Figure 2:
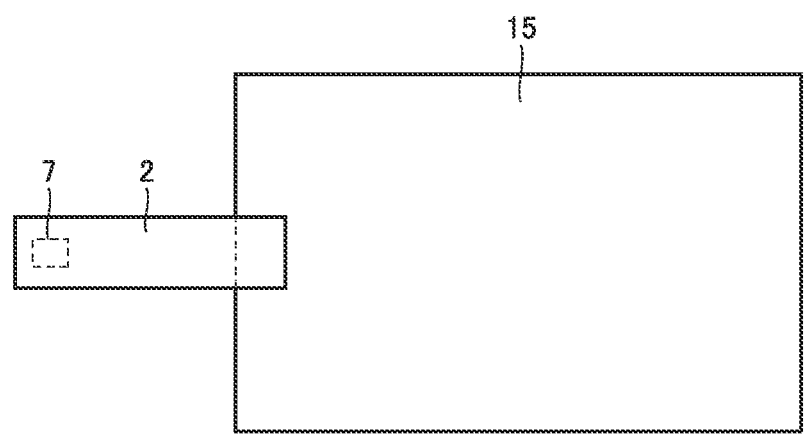
FIG. 2 shows a probe, a cantilever and a holder.

FIG. 2 shows probe 7, cantilever 2 and a holder 15. As shown in FIG. 2, probe 7 is attached to the tip of cantilever 2. Holder 15 is a member that supports cantilever 2. The laser beam from beam splitter 3 enters, for example, a region on the rear side of probe 7 of cantilever 2, and the incident laser beam is reflected by cantilever 2. The reflected beam is reflected by reflecting mirror 4 and enters photodetector 5.

Figure 3:
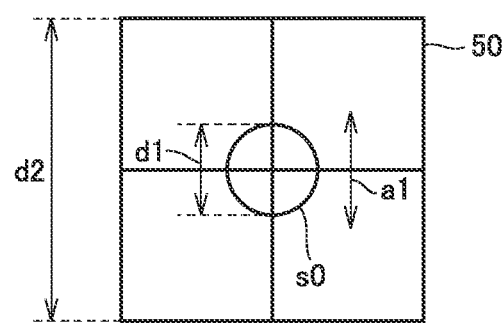
FIG. 3 illustrates displacement of a laser spot in a photodetector during measurement of a sample.

FIG. 3 illustrates displacement of the laser spot in photodetector 5 during measurement of the sample. Light receiving surface 50 is a surface for detecting the spot of the laser beam in photodetector 5, which is reflected by cantilever 2. The laser beam reflected by cantilever 2 shown in FIG. 2 forms a substantially circular laser spot s0 on light receiving surface 50. Light receiving surface 50 has a square shape with a length d2 of one side. Light receiving surface 50 is divided into four parts. Photodetector 5 detects a position of laser spot s0 by comparing ratios of laser spot s0 detected on the divided light receiving surfaces.

More specifically, before measurement of the sample and with cantilever 2 not being displaced, the position of photodetector 5 is adjusted such that laser spot s0 is located at the center of light receiving surface 50. When cantilever 2 is displaced during measurement of the sample, the position of laser spot s0 is displaced in a direction (direction of an arrow a1) corresponding to the displacement direction (i.e., deflection direction) of the cantilever. The direction of arrow a1 corresponds to "first direction". A diameter d1 of laser spot s0 is adjusted to a diameter suitable for measurement of the sample by laser beam adjustment unit 20.

Position adjustment of photodetector 5 will be described below. First, position adjustment of photodetector 5 according to a comparative example will be described.

Figure 4:
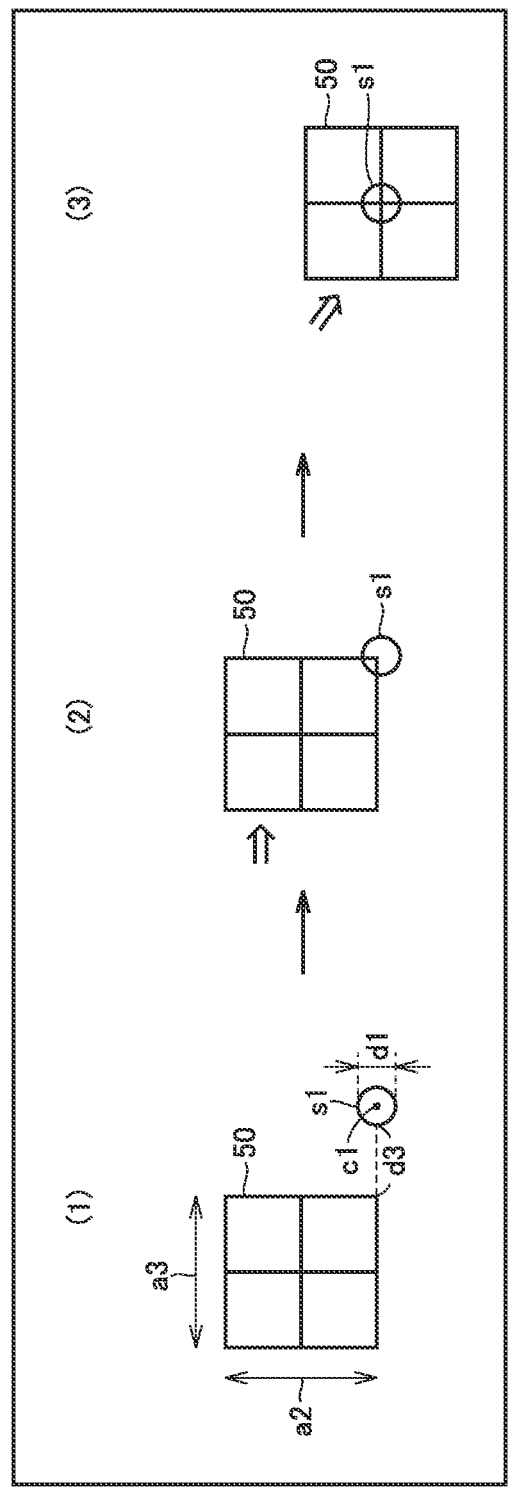
FIG. 4 illustrates one example of position adjustment of the photodetector according to a comparative example.

FIG. 4 illustrates one example of position adjustment of photodetector 5 according to the comparative example. Before measurement of the sample, the position of photodetector 5 is adjusted such that a laser spot s1 is located at the center of light receiving surface 50 as shown in FIG. 4(3). FIGS. 4(1) and 4(2) show a process of adjustment to the appropriate position.

FIG. 4(1) shows a state in which an irradiation range of the laser beam is outside light receiving surface 50 and spot s1 is not within light receiving surface 50. In this state, photodetector 5 cannot detect the laser beam, and thus, cannot determine in which direction laser spot s1 is located with respect to light receiving surface 50. Therefore, the analyst moves photodetector 5 in a direction indicated by an arrow a2 (hereinafter, also referred to as "direction a2") and in a direction indicated by an arrow a3 (hereinafter, also referred to as "direction a3"), and continues to move photodetector 5 until at least a part of laser spot s1 is included in light receiving surface 50. Direction a2 is the same as direction a1 in FIG. 3. Therefore, direction a3 corresponds to "second direction" orthogonal to direction a1. A center c1 of spot s1 and a distance d3 between spot s1 and light receiving surface 50 will be described below.

FIG. 4(2) shows a state in which at least a part of laser spot s1 is included in light receiving surface 50. In this state, the analyst can estimate the direction of laser spot s1 with respect to light receiving surface 50. Therefore, the analyst operates operation unit 13 to drive photodetector 5 in the estimated direction of laser spot s1, and the analyst performs an adjustment such that laser spot s1 is located at the center of light receiving surface 50.

FIG. 4(3) shows a state in which laser spot s1 has been adjusted to be located at the center of light receiving surface 50 as a result of movement of photodetector 5 in the estimated direction of laser spot s1.

In the comparative example, the position of photodetector 5 is adjusted such that laser spot s1 is located at the center of light receiving surface 50 in this way. However, in the comparative example, when the laser beam is located outside light receiving surface 50 at the start of position adjustment of photodetector 5, it is concerned that it takes time to bring about the state in which at least a part of laser spot s1 is included in light receiving surface 50. That is, it is concerned that the time from FIG. 4(1) to FIG. 4(2) is long.

Accordingly, in scanning probe microscope 100 according to the present embodiment, a shape and/or a size of the spot of the laser beam is/are adjusted, which makes it easier for the laser spot to enter the light receiving surface. As a result, the time required until at least a part of the laser spot is included in light receiving surface 50 is reduced. In the first embodiment, a case of increasing a length of the laser spot in direction a3 without changing a length of the laser spot in direction a2 will be described.

Figure 5:
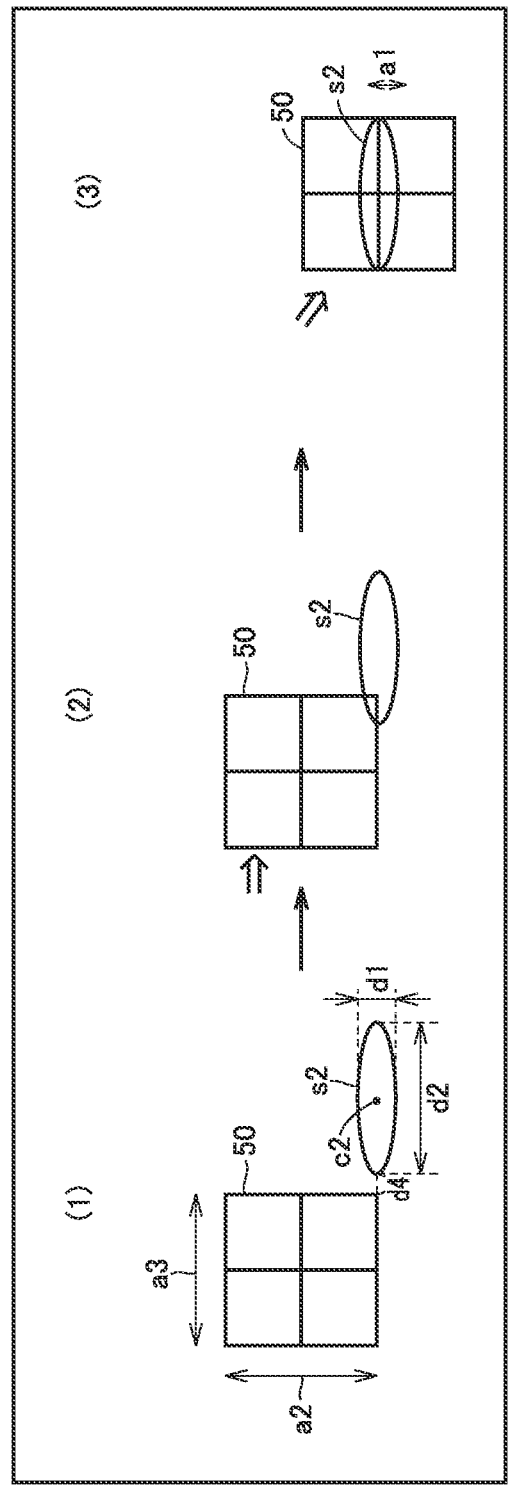
FIG. 5 illustrates one example of position adjustment of the photodetector according to the first embodiment.

FIG. 5 illustrates one example of position adjustment of the photodetector according to the first embodiment. FIG. 5 is a diagram to be compared with FIG. 4. In FIG. 5, a spot s2 of the laser beam is different from spot s1 of the laser beam in FIG. 4.

In FIG. 5, length d1 of laser spot s2 in direction a2 (i.e., direction of displacement of spot s2 caused by displacement (deflection) of the cantilever) is equal to length d1 of laser spot s1 in direction a2 in FIG. 4(1). Length d2 of laser spot s2 in direction a3 is adjusted to be longer than d1 and equal to length d2 of light receiving surface 50 in direction a3. That is, laser spot s2 has an elliptical shape with longer diameter d2 and shorter diameter d1. A position of a center c2 of spot s2 with respect to light receiving surface 50 in FIG. 5(1) is the same as the position of center c1 of spot s1 with respect to light receiving surface 50 in FIG. 4(1). However, a distance d4 between spot s2 and light receiving surface 50 in FIG. 5(1) is shorter than distance d3 between spot s1 and light receiving surface 50 in FIG. 4(1).

In a state shown in FIG. 5(1), laser spot s2 is located outside light receiving surface 50, and thus, it cannot be determined in which direction laser spot s2 is located with respect to light receiving surface 50. Therefore, the analyst moves photodetector 5 in direction a2 and direction a3 until at least a part of laser spot s2 is included in light receiving surface 50, i.e., until a state shown in FIG. 5(2) occurs. As described above, distance d4 between spot s2 and light receiving surface 50 in FIG. 5(1) is shorter than distance d3 between spot s1 and light receiving surface 50 in FIG. 4(1). Therefore, it is highly likely that the time required until at least a part of the laser spot is included in light receiving surface 50 is reduced.

When the state shown in FIG. 5(2) occurs, the analyst can estimate the direction of laser spot s2 with respect to light receiving surface 50. Therefore, the analyst moves photodetector 5 in the estimated direction of laser spot s2 and operates operation unit 13 such that laser spot s2 is located at the center of light receiving surface 50. As a result, as shown in FIG. 5(3), laser spot s2 is adjusted to be located at the center of light receiving surface 50.

In FIG. 5(3), length d1 in direction a1 corresponding to the direction of displacement of the cantilever is equal to that of the comparative example. Therefore, even when the sample is measured in the state shown in FIG. 5(3), the same measurement accuracy as that when the sample is measured in the state shown in FIG. 4(3) can be achieved. Therefore, it is unnecessary to adjust the laser spot after position adjustment of photodetector 5 and before measurement of the sample, which eliminates the extra time.

Furthermore, in FIGS. 4 and 5 above, description has been given of the case in which laser spot s1, s2 is located outside light receiving surface 50 at the start of position adjustment of photodetector 5 (i.e., FIG. 4(1) and FIG. 5(1)). Actually, however, at least a part of laser spot s1, s2 may be included in light receiving surface 50 at the start of position adjustment of photodetector 5 (i.e., FIG. 4(2) and FIG. 5(2)). Even though a positional relationship between photodetector 5 and center c1 of laser spot s1 is the same as a positional relationship between photodetector 5 and center c2 of laser spot s2 at the start of position adjustment, a possibility that at least a part of laser spot s2 is included in light receiving surface 50 is higher than a possibility that at least a part of laser spot s1 is included in light receiving surface 50, because a width of laser spot s2 in direction a3 is greater than a width of laser spot s1 in direction a3. That is, the use of laser spot s2 according to the first embodiment, not laser spot s1 according to the comparative example, increases the possibility that a part of the laser spot is included in light receiving surface 50 at the start of position adjustment of photodetector 5. Therefore, in the first embodiment, there is a high possibility that a search for the laser spot located outside light receiving surface 50 is unnecessary, and thus, a reduction in time required for position adjustment of photodetector 5 is expected.

Although light receiving surface 50 is shown as having a square shape in FIG. 5, the shape of light receiving surface 50 is not limited thereto, and may be, for example, a rectangular shape or a circular shape. In addition, although the length of laser spot s2 in direction a3 is defined as d2 equal to one side of light receiving surface 50, the length of laser spot s2 in direction a3 is not limited thereto, and may only be longer than the length of laser spot s1 in direction a3 in the comparative example as long as the intensity sufficient for detection on light receiving surface 50 can be ensured.

As described above, in scanning probe microscope 100 according to the first embodiment, the length of spot s2 in direction a3 is increased without changing the length of spot s2 in direction a2, and thus, it is possible to reduce the time required until at least a part of the laser spot is included in light receiving surface 50 of photodetector 5 when the laser spot is located outside light receiving surface 50 in position adjustment of photodetector 5, as compared with the conventional scanning probe microscope according to the comparative example. Furthermore, it is possible to increase the probability that at least a part of the laser spot is included in light receiving surface 50 of photodetector 5 at the start of position adjustment of photodetector 5. Therefore, the time required for position adjustment of photodetector 5 can be reduced. In addition, scanning probe microscope 100 according to the first embodiment is the same as the conventional scanning probe microscope in terms of a dimension of the spot corresponding to the direction of displacement of the cantilever. Therefore, the sample can be measured at the same accuracy as that of the conventional scanning probe microscope, without adjusting the laser spot after position adjustment. Thus, scanning probe microscope 100 according to the first embodiment has such an advantage that the extra time is not required before analysis of the sample.

Modification of First Embodiment

Figure 6:
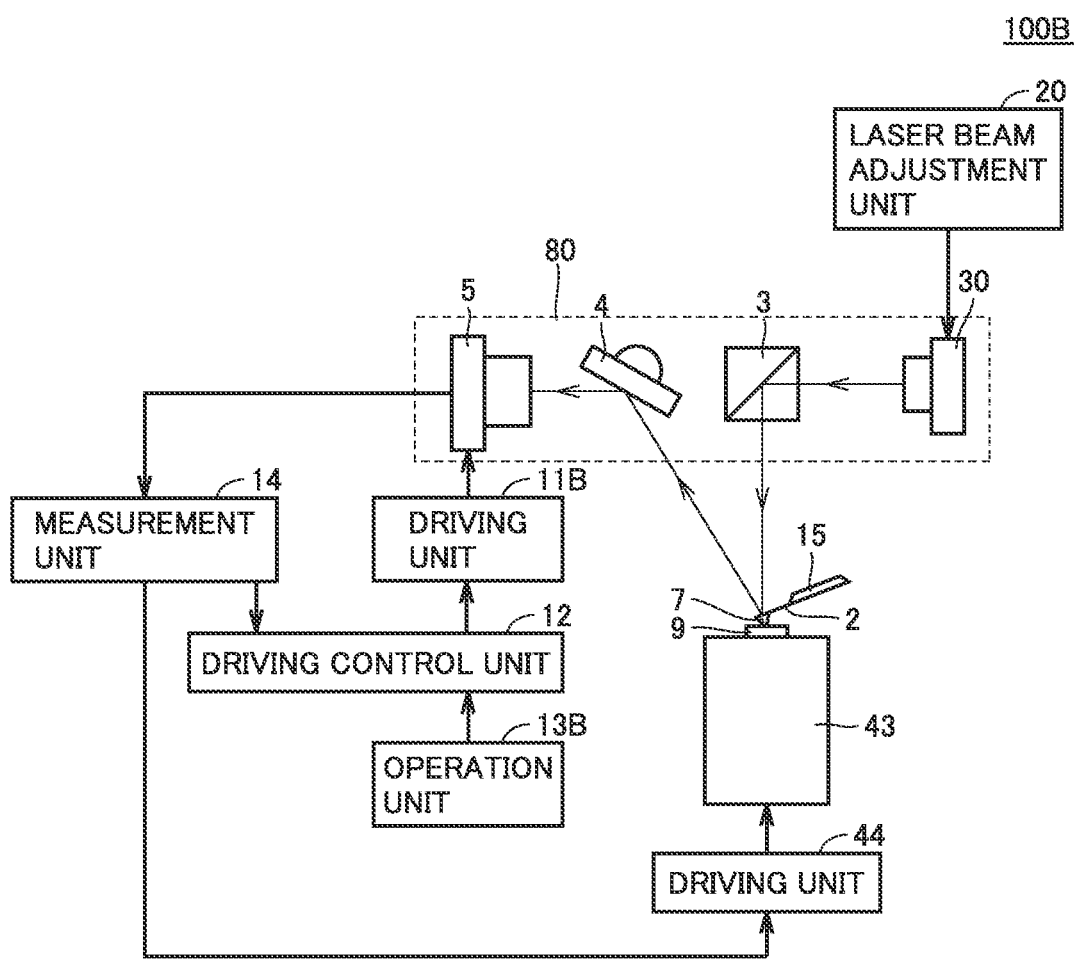
FIG. 6 is a schematic view showing a configuration of a scanning probe microscope according to a modification of the first embodiment.

FIG. 6 is a schematic view showing a configuration of a scanning probe microscope 100B according to a modification of the first embodiment. FIG. 6 is a diagram to be compared with FIG. 1. FIG. 6 is different from FIG. 1 in that a driving unit 11B, a driving control unit 12 and an operation unit 13B are added. In scanning probe microscope 100B, driving control unit 12 controls driving unit 11B in accordance with an instruction from operation unit 13B, to thereby allow automatic position adjustment of photodetector 5.

Driving unit 11B is a mechanism for moving a position of photodetector 5. Driving unit 11B is implemented by adding a mechanism such as a motor for operating driving unit 11 to driving unit 11.

Operation unit 13B is used when the analyst provides, to driving control unit 12, an instruction to start position adjustment of photodetector 5. Operation unit 13B is implemented by, for example, a touch panel, a button or the like.

Driving control unit 12 automatically controls the position of photodetector 5, which is controlled by the analyst in the first embodiment. Driving control unit 12 receives, from operation unit 13B, the instruction to start position adjustment of photodetector 5. Driving control unit 12 receives a detection signal of photodetector 5 from measurement unit 14 and controls driving unit 11B based on the signal, to thereby perform position adjustment of photodetector 5. Specifically, based on the detection signal of photodetector 5, driving control unit 12 determines a direction and a distance of movement of photodetector 5 and controls driving unit 11B to thereby move photodetector 5.

Figure 7:
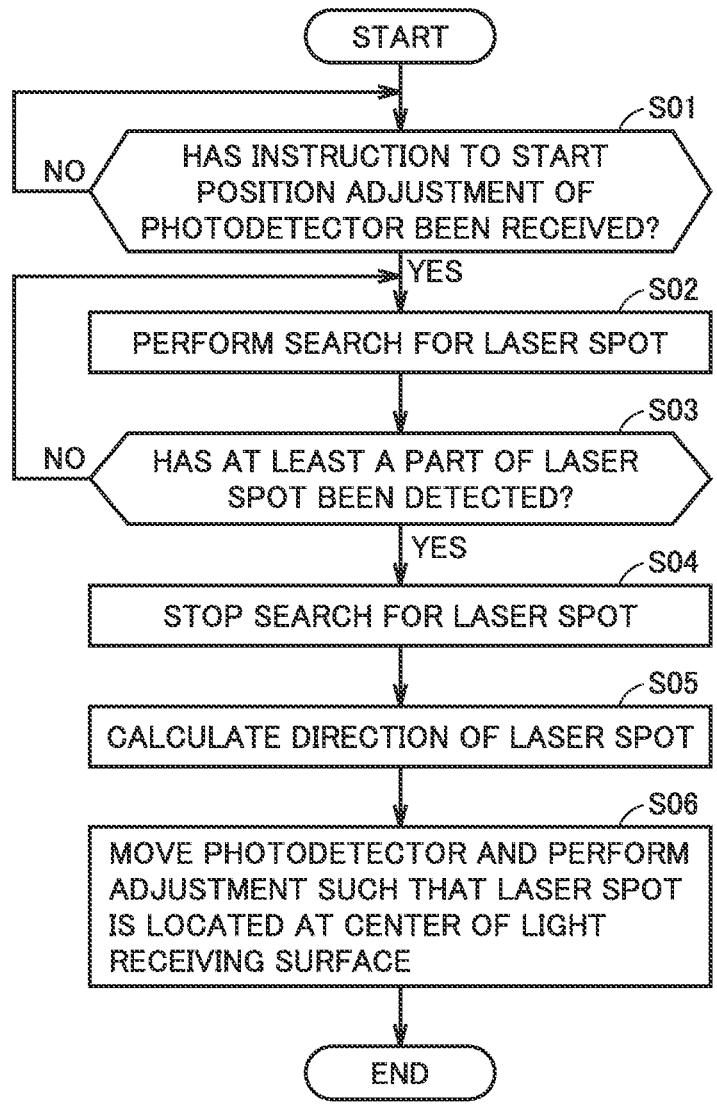
FIG. 7 is a flowchart for illustrating control of position adjustment of a photodetector according to the modification of the first embodiment.

FIG. 7 is a flowchart for illustrating control of position adjustment of photodetector 5 according to the modification of the first embodiment. The flowchart in FIG. 7 is executed by driving control unit 12 when driving control unit 12 receives, from operation unit 13B, the instruction to start position adjustment of photodetector 5.

In step S01, driving control unit 12 determines whether or not the instruction to start position adjustment of photodetector 5 has been received from operation unit 13B. When the instruction to start position adjustment of photodetector 5 has not been received from operation unit 13B (NO in step S01), driving control unit 12 repeats step S01. When the instruction to start position adjustment of photodetector 5 has been received from operation unit 13B (YES in step S01), driving control unit 12 performs a search for laser spot s2 in photodetector 5 in step S02. An operation for searching for laser spot s2 in photodetector 5 refers to, for example, an operation for sequentially moving photodetector 5 in direction a2 and direction a3 in FIG. 5(1).

In step S03, driving control unit 12 determines whether or not a spot detection signal indicating detection of at least a part of laser spot s2 on light receiving surface 50 has been received from measurement unit 14. When the spot detection signal about laser spot s2 on light receiving surface 50 has not been received from measurement unit 14 (NO in step S03), driving control unit 12 returns the process to step S02 and continues the search for laser spot s2 in photodetector 5. In contrast, when the spot detection signal about laser spot s2 on light receiving surface 50 has been received from measurement unit 14 (YES in step S03), driving control unit 12 stops the search for laser spot s2 in photodetector 5 in step S04.

In step S05, driving control unit 12 calculates a direction of laser spot s2 with respect to the light receiving surface from the position of laser spot s2 on light receiving surface 50. In step S06, driving control unit 12 moves photodetector 5 in the direction of laser spot s2 and performs an adjustment such that laser spot s2 is located at the center of light receiving surface 50.

As described above, scanning probe microscope 100B according to the modification of the first embodiment provides the same function and effect as those of the first embodiment, and also allows automatic position adjustment of photodetector 5.

Therefore, scanning probe microscope 100B according to the modification of the first embodiment can reduce the analyst's burden.

Second Embodiment

Figure 8:
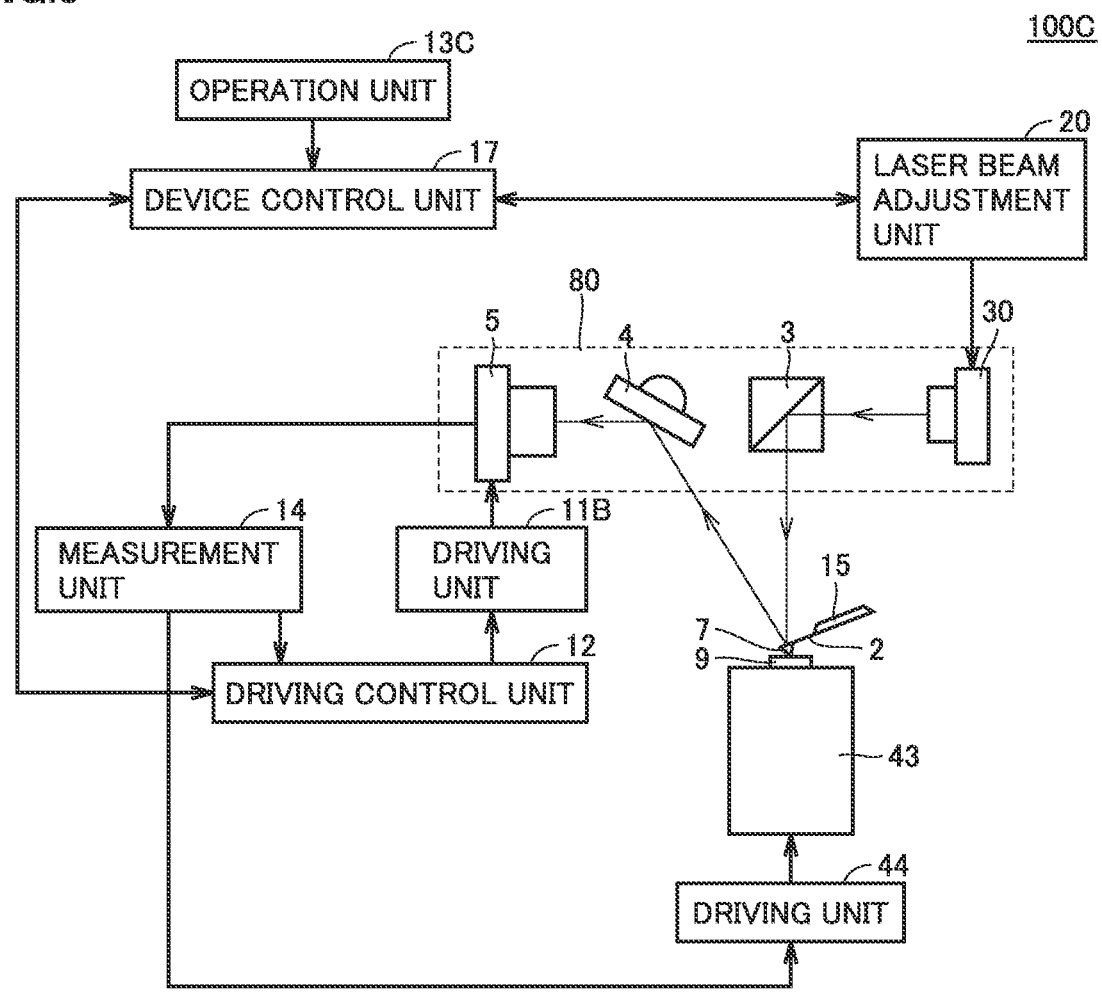
FIG. 8 is a schematic view showing a configuration of a scanning probe microscope according to a second embodiment.

In a scanning probe microscope 100C according to a second embodiment, a spot diameter during position adjustment of photodetector 5 is made larger than a spot diameter during measurement of the sample in order to reduce the time required for position adjustment of photodetector 5 as compared with the scanning probe microscope according to the comparative example. FIG. 8 is a schematic view showing a configuration of the scanning probe microscope according to the second embodiment. FIG. 8 is a diagram to be compared with FIG. 6. FIG. 8 is different from FIG. 6 in that a device control unit 17 and an operation unit 13C are added. In scanning probe microscope 100C, device control unit 17 controls laser beam adjustment unit 20 and driving control unit 12 in accordance with an instruction from operation unit 13C, to thereby allow position adjustment of photodetector 5 and adjustment of a laser beam associated therewith.

Operation unit 13C is used when the analyst provides, to device control unit 17, an instruction to start position adjustment of photodetector 5. Operation unit 13C is implemented by, for example, a touch panel, a button or the like.

Device control unit 17 controls laser beam adjustment unit 20 and driving control unit 12 as appropriate in position adjustment of photodetector 5. In order to do so, device control unit 17 transmits and receives a signal from and to laser beam adjustment unit 20 and driving control unit 12 in a wired or wireless manner.

Figure 9:
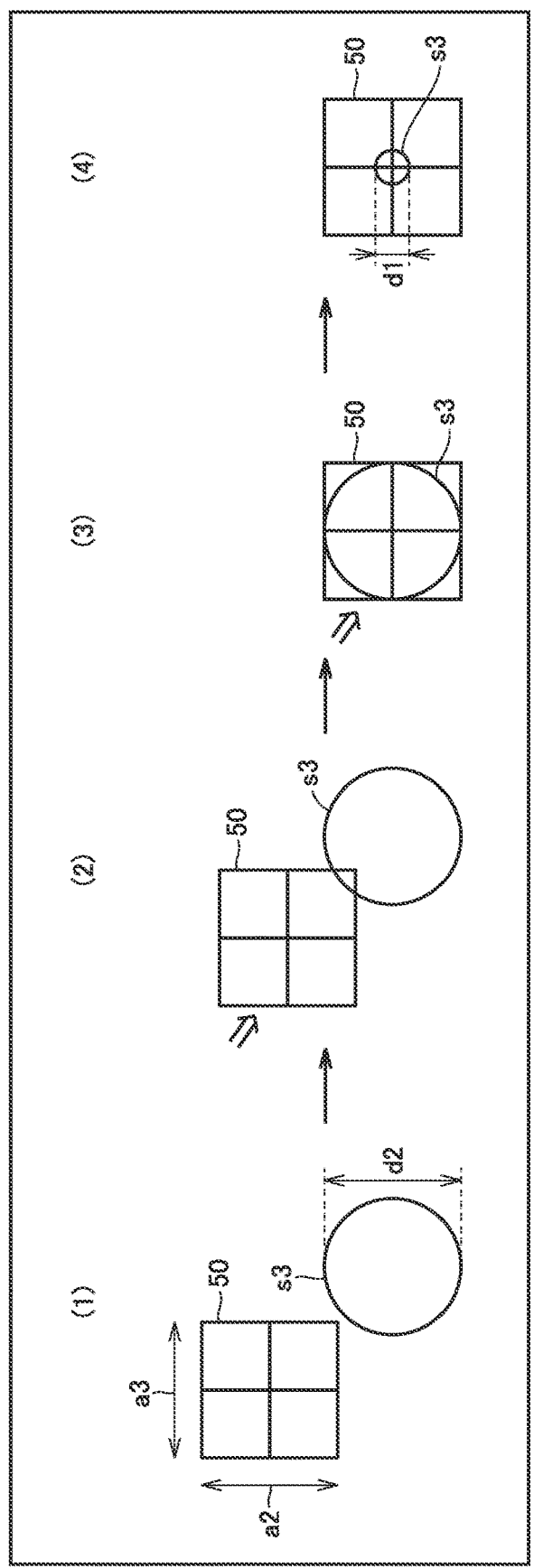
FIG. 9 illustrates one example of position adjustment of a photodetector according to the second embodiment.

FIG. 9 illustrates one example of position adjustment of the photodetector according to the second embodiment. FIG. 9 is a diagram to be compared with FIG. 4. FIG. 9 is different from FIG. 4 in terms of a spot of a laser beam. In FIGS. 9(1) to 9(3), a laser spot s3 has a circular shape having a diameter of the same length as length d2 of one side of light receiving surface 50. Laser spot s3 having a circular shape also includes a state in which laser spot s3 has a substantially circular shape.

Figure 10:
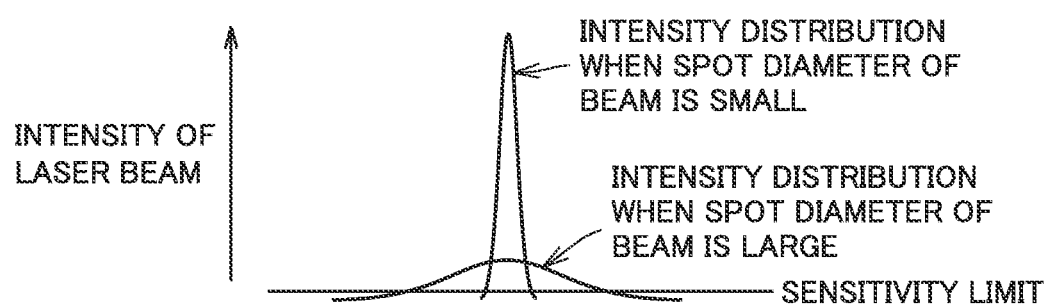
FIG. 10 shows a relationship between a spot diameter of a laser beam and an intensity of the laser beam.

FIG. 10 shows a relationship between a spot diameter of the laser beam and an intensity of the laser beam. As shown in FIG. 10, as the spot diameter of the laser beam becomes larger, the intensity of the laser beam becomes lower. Laser spot s3 is a laser spot that satisfies the condition that the laser spot has an intensity equal to or higher than a sensitivity limit within a range of diameter d2.

In a state shown in FIG. 9(1), laser spot s3 is located outside light receiving surface 50, and thus, it cannot be determined in which direction laser spot s3 is located with respect to light receiving surface 50. Therefore, driving control unit 12 moves photodetector 5 in direction a2 and direction a3, to thereby bring about a state in which at least a part of laser spot s3 is included in light receiving surface 50, i.e., a state shown in FIG. 9(2). A diameter of spot s3 in FIG. 9(1) is larger than a diameter of spot s1 in FIG. 4(1). Therefore, the time required until the spot enters the light receiving surface can be reduced as compared with the comparative example in FIG. 4. In addition, it is possible to increase the probability that at least a part of the laser spot has already been included in light receiving surface 50 at the start of position adjustment of photodetector 5.

When the state shown in FIG. 9(2) occurs, driving control unit 12 can estimate the direction of laser spot s3 with respect to light receiving surface 50. Therefore, driving control unit 12 moves photodetector 5 in the estimated direction of laser spot s3 and controls driving unit 11B such that laser spot s3 is located at the center of light receiving surface 50. As a result, as shown in FIG. 9(3), laser spot s3 is adjusted to be located at the center of light receiving surface 50.

When the state shown in FIG. 9(3) occurs, laser beam adjustment unit 20 adjusts a size of the laser beam such that the diameter of laser spot s3 becomes equal to diameter d1 suitable for measurement of the sample (FIG. 9(4)).

Figure 11:
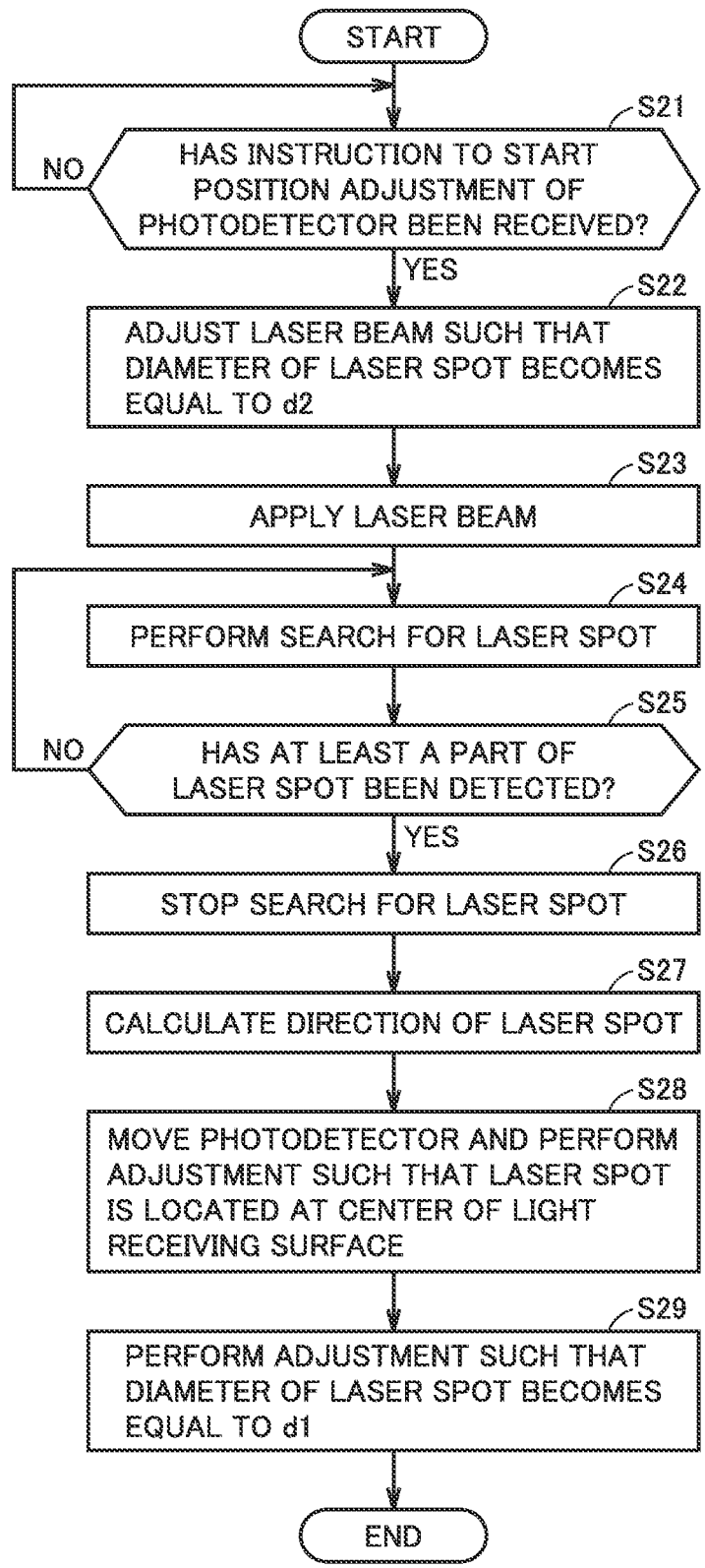
FIG. 11 is a flowchart for illustrating control of position adjustment of the photodetector according to the second embodiment.

FIG. 11 is a flowchart for illustrating control of position adjustment of the photodetector according to the second embodiment. The flowchart in FIG. 11 is executed by device control unit 17 and driving control unit 12 when device control unit 17 receives an instruction to start position adjustment of photodetector 5.

In step S21, device control unit 17 determines whether or not the instruction to start position adjustment of photodetector 5 has been received from operation unit 13C. When the instruction to start position adjustment of photodetector 5 has not been received from operation unit 13C (NO in step S21), device control unit 17 repeats step S21. When the instruction to start position adjustment of photodetector 5 has been received from operation unit 13C (YES in step S21), device control unit 17 controls laser beam adjustment unit 20 and adjusts the focus lens and/or the collimate lens of laser beam source 30 such that the diameter of laser spot s3 becomes equal to d2 in step S22. In step S23, device control unit 17 causes laser beam source 30 to apply a laser beam.

In step S24, device control unit 17 controls driving control unit 12 and performs a search for laser spot s3 in photodetector 5. Specifically, device control unit 17 performs an operation for sequentially moving photodetector 5 in direction a2 and direction a3 in FIG. 9(1), for example.

In step S25, device control unit 17 determines whether or not a spot detection signal indicating detection of at least a part of laser spot s3 on light receiving surface 50 has been received from driving control unit 12. When the spot detection signal about laser spot s3 on light receiving surface 50 has not been received from driving control unit 12 (NO in step S25), device control unit 17 returns the process to step S24 and continues the search for laser spot s3 in photodetector 5.

In contrast, when the spot detection signal about laser spot s3 on light receiving surface 50 has been received from driving control unit 12 (YES in step S25), device control unit 17 stops the search for laser spot s3 in photodetector 5 in step S26.

In step S27, driving control unit 12 calculates a direction of the laser spot with respect to the light receiving surface from the position of the laser spot detected on light receiving surface 50. In step S28, based on a result of calculation, driving control unit 12 moves photodetector 5 in the direction of the laser spot and performs an adjustment such that the laser spot is located at the center of light receiving surface 50. Thereafter, driving control unit 12 transmits, to device control unit 17, a signal indicating that the adjustment has ended.

In step S29, device control unit 17 controls laser beam adjustment unit 20 and adjusts the focus lens of laser beam source 30 such that the diameter of laser spot s3 becomes equal to d1.

As described above, scanning probe microscope 100C according to the second embodiment provides the same function and effect as those of the first embodiment by making the diameter of the laser spot during position adjustment of photodetector 5 larger than the diameter of the laser spot during measurement of the sample.

Third Embodiment

Figure 12:
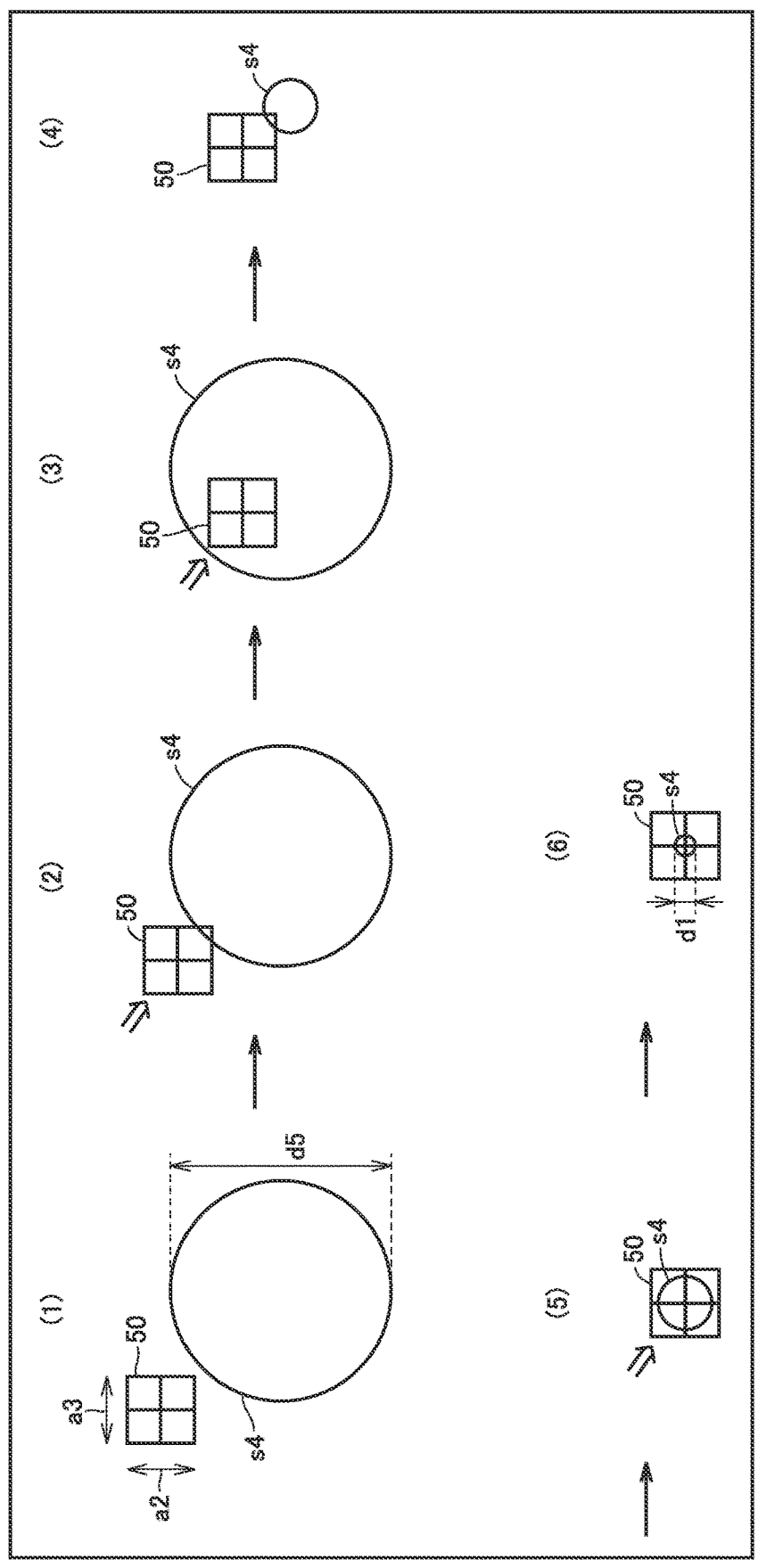
FIG. 12 illustrates one example of position adjustment of a photodetector according to a third embodiment.

FIG. 12 illustrates one example of position adjustment of a photodetector according to a third embodiment. FIG. 12 is a diagram to be compared with FIG. 4. In FIG. 12, a spot s4 of a laser beam is different in size from spot s3 of the laser beam in FIG. 4.

In FIGS. 12(1) to 12(3), laser spot s4 has a circular shape having a diameter d5 longer than one side of light receiving surface 50. Laser spot s4 having a circular shape also includes a state in which laser spot s4 has a substantially circular shape. d5 is, for example, a diameter that maximizes a region where an intensity equal to or higher than a sensitivity limit can be ensured (see FIG. 10).

In a state shown in FIG. 12(1), laser spot s4 is located outside light receiving surface 50, and thus, it cannot be determined in which direction laser spot s4 is located with respect to light receiving surface 50. Therefore, driving control unit 12 moves photodetector 5 in direction a2 and direction a3 until at least a part of laser spot s4 is included in light receiving surface 50, i.e., until a state shown in FIG. 12(2) occurs. A diameter of spot s4 in FIG. 12(2) is larger than the diameter of spot s1 in FIG. 4(1). Therefore, the time required until at least a part of spot s1 is included in light receiving surface 50 is reduced. In addition, the probability that at least a part of laser spot s4 has already been included in light receiving surface 50 at the start of position adjustment of photodetector 5 is also high.

When the state shown in FIG. 12(2) occurs, driving control unit 12 can estimate the direction of laser spot s4 with respect to light receiving surface 50. Therefore, driving control unit 12 moves photodetector 5 in the estimated direction of laser spot s4 and locates laser spot s4 at the center of light receiving surface 50. Since laser spot s4 is larger than light receiving surface 50, driving control unit 12 can no longer recognize the direction of laser spot s4 when light receiving surface 50 as a whole is included in laser spot s4 as shown in FIG. 12(3).

When the state shown in FIG. 12(3) occurs, laser beam adjustment unit 20 adjusts the focus lens of laser beam source 30 such that the diameter of laser spot s4 becomes as small as possible within a range where at least a part of laser spot s4 is included in light receiving surface 50 and within a range where the diameter of laser spot s4 is larger than diameter d1 of laser spot s4 during measurement of the sample. As a result, laser spot s4 enters a state shown in FIG. 12(4).

When laser spot s4 enters the state shown in FIG. 12(4), driving control unit 12 can again estimate the direction of laser spot s4 with respect to light receiving surface 50. Therefore, driving control unit 12 moves photodetector 5 in the estimated direction of laser spot s4 and operates operation unit 13C such that laser spot s4 is located at the center of light receiving surface 50. At this time, when light receiving surface 50 as a whole is within the range of laser spot s4 as shown in FIG. 12(3), the operation shown in FIGS. 12(4) to 12(5) is repeated. When laser spot s4 is located at the center of light receiving surface 50, laser beam adjustment unit 20 adjusts the laser beam such that the diameter of laser spot s4 becomes equal to diameter d1 suitable for measurement of the sample (FIG. 12(6)).

Figure 13:
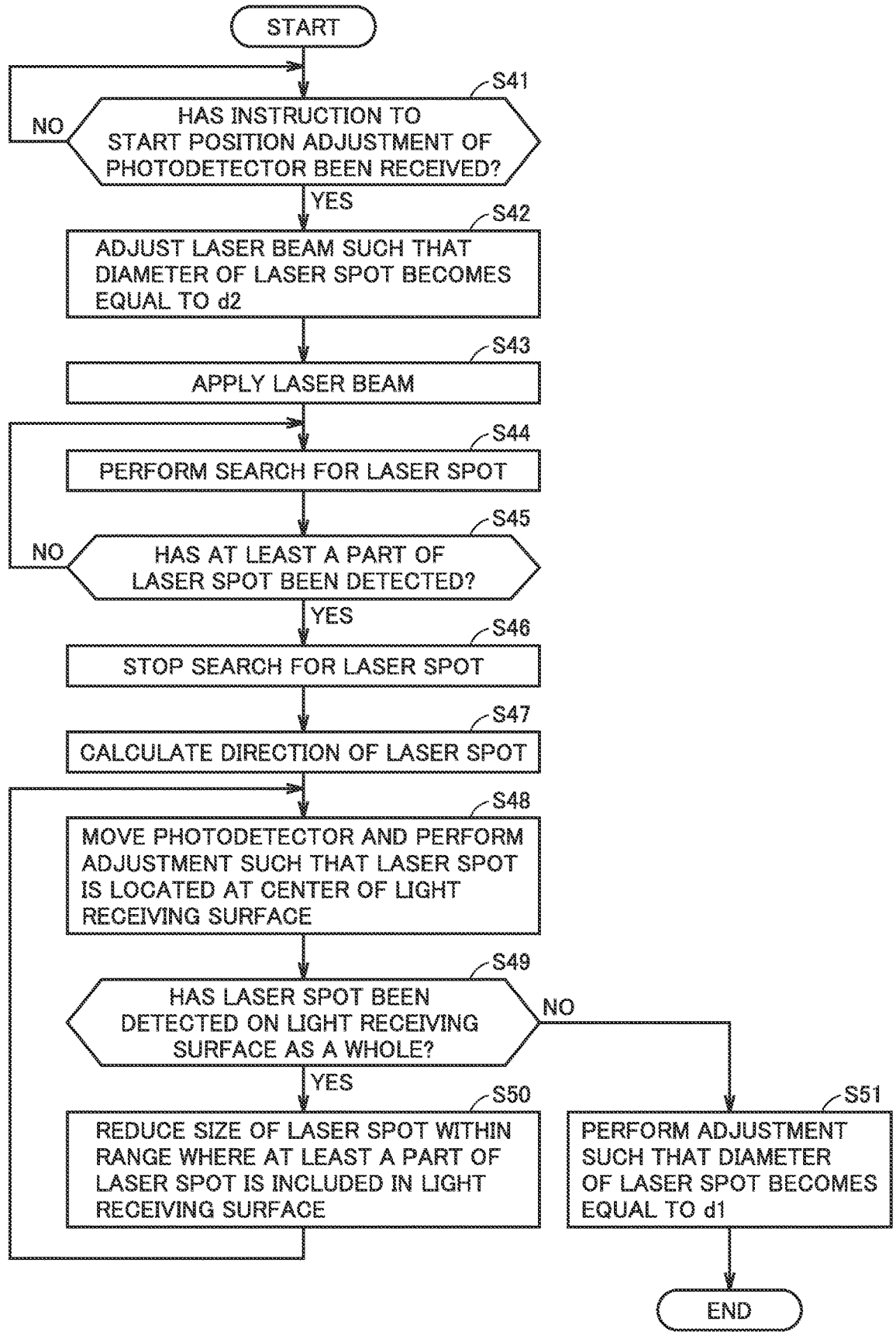
FIG. 13 is a flowchart for illustrating control of position adjustment of the photodetector according to the third embodiment.

FIG. 13 is a flowchart for illustrating control of position adjustment of photodetector 5 according to the third embodiment. The flowchart in FIG. 13 is executed by device control unit 17 and driving control unit 12 when device control unit 17 receives an instruction to start position adjustment of photodetector 5.

Steps S41 to S47 correspond to steps S21 to S27 in FIG. 11, and thus, description will not be repeated.

In step S48, driving control unit 12 moves photodetector 5 in the direction of laser spot s4 and performs an adjustment such that the laser spot is located at the center of light receiving surface 50.

In step S49, driving control unit 12 determines whether or not laser spot s4 has been detected on light receiving surface 50 as a whole, and transmits a result of determination to device control unit 17. When laser spot s4 has been detected on light receiving surface 50 as a whole (YES in step S49), device control unit 17 reduces the size of laser spot s4 within a range where at least a part of laser spot s4 is included in light receiving surface 50 in step S50, and returns the process to step S48.

When laser spot s4 has been detected on a part of light receiving surface 50 (NO in step S49), device control unit 17 provides an instruction to laser beam adjustment unit 20 and adjusts the laser beam such that the diameter of laser spot s4 becomes equal to d1 in step S51.

As described above, scanning probe microscope 100C according to the third embodiment provides the same function and effect as those of the first embodiment by making the diameter of the laser spot during position adjustment of photodetector 5 larger than the diameter of the laser spot during measurement of the sample.

In scanning probe microscopes 100 and 100B according to the first embodiment and the modification thereof, description has been given of the configuration in which laser spot s2 has an elliptical shape both during position adjustment of photodetector 5 and during measurement of the sample. Laser spot s2 may be configured to have an elliptical shape at all times. Alternatively, laser spot s2 may be configured to be adjusted to have an elliptical shape before the start of position adjustment of photodetector 5. In this case, the adjustment of the shape of laser spot s2 may be performed in response to reception of an instruction from the analyst as shown in FIG. 14.

In scanning probe microscopes 100C according to the second and third embodiments, description has been given of the configuration in which, during position adjustment of photodetector 5, laser spots s3 and s4 are adjusted to have a substantially circular shape having a spot diameter larger than that during measurement of the sample. In the above-described configuration, the adjustment of the shape of laser spots s3 and s4 can be performed in response to reception of an instruction from the analyst as shown in FIG. 14.

Figure 14:
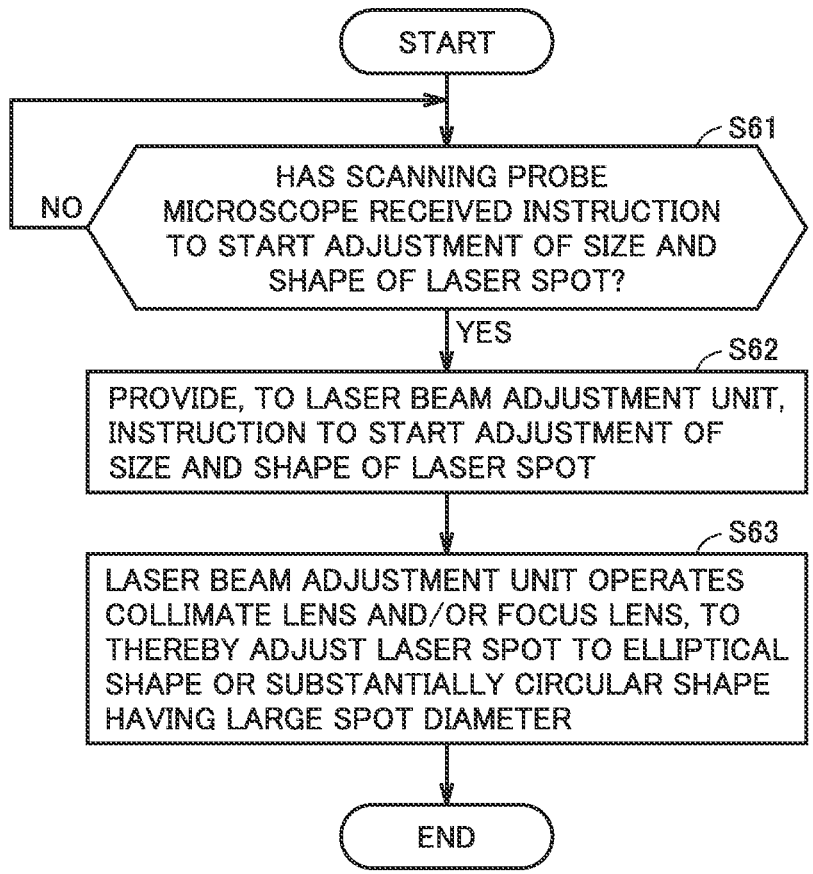
FIG. 14 is a flowchart for illustrating one example of control of adjustment of a size and a shape of a laser spot according to the first to third embodiments.

FIG. 14 is a flowchart for illustrating one example of control of adjustment of the size and the shape of the laser spot according to the first to third embodiments. In step S61, scanning probe microscopes 100, 100B and 100C determine whether or not a signal for starting adjustment of the size and the shape of the laser spot has been received from the analyst. This is implemented, for example, by the analyst pressing operation buttons disposed on scanning probe microscopes 100, 100B and 100C. Particularly, in scanning probe microscopes 100B and 100C according to the modification of the first embodiment, the second embodiment and the third embodiment, the operation buttons can be provided on operation units 13B and 13C.

When the signal for starting adjustment of the size and the shape of the laser spot has not been received from the analyst (NO in step S61), scanning probe microscopes 100, 100B and 100C repeat step S61.

When scanning probe microscopes 100, 100B and 100C have received the signal for starting adjustment of the size and the shape of the laser spot from the analyst (YES in step S61), a signal for commanding the start of adjustment of the size and the shape of the laser spot is transmitted to laser beam adjustment unit 20 in step S62.

In step S63, when laser beam adjustment unit 20 has received the signal for commanding the start of adjustment of the size and the shape of the laser spot, laser beam adjustment unit 20 operates the collimate lens and/or the focus lens of laser beam source 30, to thereby adjust laser spot s2 to an elliptical shape. Alternatively, laser beam adjustment unit 20 adjusts laser spots s3 and s4 to a substantially circular shape having a spot diameter larger than that during measurement of the sample.

During measurement of the sample by the scanning probe microscope, the shape of the sample can be observed based on displacement of the laser spot in direction a2 (see FIG. 5) that is a direction corresponding to the deflection direction of cantilever 2. In contrast, the friction force of the sample can be observed based on displacement of the laser spot in direction a3 (see FIG. 5) orthogonal to direction a2.

Therefore, scanning probe microscope 100 according to the first embodiment can also adjust the position of photodetector 5 based on elliptical laser spot s2, and then, shorten a length of laser spot s2 in direction a3 to such that laser spot s2 has a substantially perfect circular shape, and measure the sample. As a result, scanning probe microscope 100 can observe the friction force of the sample with a high degree of accuracy, in addition to the shape of the sample.

The length of the laser spot in direction a3 (see FIG. 5) can be adjusted by moving the collimate lens back and forth along an optical axis (i.e., bringing the collimate lens closer to the laser oscillator side and to the focus lens side). As a result, laser spot s2 in the first embodiment can be formed into an elliptical shape. In addition, even after laser spot s2 is formed, the length in direction a3 can be adjusted.

Although the case of the laser spot having a circular shape (including a substantially circular shape) or an elliptical shape has been described in the first to third embodiments, the shape of the laser spot is not limited thereto and may be, for example, a rectangular shape.

Although laser spots s3 and s4 at the start of position adjustment of photodetector 5 have a circular shape having diameter d2 and a circular shape having diameter d5 in the second and third embodiments, respectively, the present invention is not limited thereto, and laser spots s3 and s4 may have any circular shape having a spot diameter larger than a spot diameter during measurement of the properties of the sample. Alternatively, laser spots s3 and s4 in the second and third embodiments may be spots that satisfy the conditions that the length thereof in direction a2 is longer than d1 and the length thereof in direction a3 is longer than d1. However, when the spot has a radius that allows recognition that the spot is located at the center of light receiving surface 50 without size adjustment when the spot enters light receiving surface 50 as in the second embodiment, there is an advantage that size adjustment of the spot may only be performed once. In contrast, when the spot diameter is a diameter that maximizes the region where the intensity equal to or higher than the sensitivity limit can be ensured as in the third embodiment, there is an advantage that the time required until at least a part of the laser spot is included in light receiving surface 50 can be further reduced.

As described above, the embodiments herein can provide a scanning probe microscope and a position adjustment method for a scanning probe microscope that can reduce the time required for position adjustment of a photodetector by adjusting a laser spot.

Aspects

It will be understood by those skilled in the art that the plurality of exemplary embodiments described above are specific examples of the following aspects.

(Clause 1) A scanning probe microscope according to an aspect comprising:

a cantilever having a probe at a tip thereof;

an irradiation unit that irradiates the cantilever with a laser beam;

a detection unit including a light receiving surface for receiving the laser beam reflected from the cantilever, the detection unit detecting a spot of the laser beam on the light receiving surface;

a driving unit that adjusts a position of the detection unit;

a measurement unit that measures properties of a sample based on displacement of the cantilever calculated from displacement of the spot of the laser beam on the light receiving surface; and a laser beam adjustment unit that adjusts the laser beam applied to the cantilever, wherein assuming that a direction of displacement of the spot of the laser beam on the light receiving surface when the cantilever is displaced during measurement of the properties of the sample is defined as a first direction, and a direction orthogonal to the first direction on the light receiving surface is defined as a second direction, the laser beam adjustment unit adjusts the laser beam such that a length of the spot of the laser beam in the second direction during adjustment of the position of the detection unit is longer than a length of the spot of the laser beam in the first direction during measurement of the properties of the sample.

In the scanning probe microscope according to clause 1, the time required for adjustment of the position of the detection unit can be reduced.

(Clause 2) The scanning probe microscope according to clause 1, wherein the laser beam adjustment unit may adjust the laser beam such that the length of the spot of the laser beam in the first direction during adjustment of the position of the detection unit is equal to the length of the spot of the laser beam in the first direction during measurement of the properties of the sample.

In the scanning probe microscope according to clause 2, the time required for adjustment of the position of the detection unit can be reduced. In addition, even when the laser spot is not adjusted after adjustment of the position of the detection unit, the sample can be analyzed without sacrificing the accuracy. Therefore, the extra time is not required before analysis of the sample.

(Clause 3) The scanning probe microscope according to clause 1, wherein the laser beam adjustment unit may adjust the laser beam such that the length of the spot of the laser beam in the first direction during adjustment of the position of the detection unit is longer than the length of the spot of the laser beam in the first direction during measurement of the properties of the sample.

In the scanning probe microscope according to clause 3, the time required for adjustment of the position of the detection unit can be reduced.

(Clause 4) The scanning probe microscope according to any one of clauses 1 to 3, further comprising a driving control unit that controls the driving unit, wherein when at least a part of the laser beam enters the light receiving surface during adjustment of the position of the detection unit, the driving control unit may move the detection unit such that the laser beam enters a center of the light receiving surface.

In the scanning probe microscope according to clause 4, the time required for adjustment of the position of the detection unit can be reduced. In addition, the analyst's burden can be reduced because adjustment of the position of the detection unit can be performed automatically.

(Clause 5) A scanning probe microscope according to an aspect comprising:

a cantilever having a probe at a tip thereof;

an irradiation unit that irradiates the cantilever with a laser beam;

a detection unit including a light receiving surface for receiving the laser beam reflected from the cantilever, the detection unit detecting a spot of the laser beam on the light receiving surface;

a driving unit that adjusts a position of the detection unit;

a measurement unit that measures properties of a sample based on displacement of the cantilever calculated from displacement of the spot of the laser beam on the light receiving surface; and a laser beam adjustment unit that adjusts the laser beam applied to the cantilever, wherein assuming that a direction of displacement of the spot of the laser beam on the light receiving surface when the cantilever is displaced during measurement of the properties of the sample is defined as a first direction, and a direction orthogonal to the first direction on the light receiving surface is defined as a second direction, the laser beam adjustment unit adjusts the laser beam such that a length of the spot of the laser beam in the second direction is longer than a length of the spot of the laser beam in the first direction.

In the scanning probe microscope according to clause 5, the time required for adjustment of the position of the detection unit can be reduced. In addition, even when the laser spot is not adjusted after adjustment of the position of the detection unit, the sample can be analyzed without sacrificing the accuracy. Therefore, the extra time is not required before analysis of the sample.

(Clause 6) A scanning probe microscope according to an aspect comprising:

a cantilever having a probe at a tip thereof;

an irradiation unit that irradiates the cantilever with a laser beam;

a detection unit including a light receiving surface for receiving the laser beam reflected from the cantilever, the detection unit detecting a spot of the laser beam on the light receiving surface;

a driving unit that adjusts a position of the detection unit;

a measurement unit that measures properties of a sample based on displacement of the cantilever calculated from displacement of the spot of the laser beam on the light receiving surface; and a laser beam adjustment unit that adjusts the laser beam applied to the cantilever, wherein the laser beam adjustment unit adjusts the laser beam such that a spot diameter of the laser beam during adjustment of the position of the detection unit is larger than a spot diameter of the laser beam during measurement of the properties of the sample.

In the scanning probe microscope according to clause 6, the time required for adjustment of the position of the detection unit can be reduced.

(Clause 7) A position adjustment method for a scanning probe microscope according to an aspect, the scanning probe microscope including a cantilever, an irradiation unit and a detection unit, the irradiation unit irradiating the cantilever with a laser beam, the detection unit including a light receiving surface for detecting a spot of the laser beam reflected from the cantilever, assuming that a direction of displacement of the spot of the laser beam on the light receiving surface during measurement of properties of a sample is defined as a first direction, and a direction orthogonal to the first direction on the light receiving surface is defined as a second direction, the laser beam being adjusted such that a length of the spot of the laser beam in the second direction during adjustment of a position of the detection unit is longer than a length of the spot of the laser beam in the first direction during measurement of the properties of the sample, the position adjustment method for the scanning probe microscope comprising:

moving the detection unit such that at least a part of the spot of the adjusted laser beam is included in the light receiving surface; and moving the detection unit such that the spot of the laser beam is located at a center of the light receiving surface.

In the position adjustment method for the scanning probe microscope according to clause 7, the time required for adjustment of the position of the detection unit can be reduced.

(Clause 8) A position adjustment method for a scanning probe microscope according to an aspect, the scanning probe microscope including a cantilever, an irradiation unit and a detection unit, the irradiation unit irradiating the cantilever with a laser beam, the detection unit including a light receiving surface for detecting a spot of the laser beam reflected from the cantilever, assuming that a direction of displacement of the spot of the laser beam on the light receiving surface during measurement of properties of a sample is defined as a first direction, and a direction orthogonal to the first direction on the light receiving surface is defined as a second direction, the laser beam being adjusted such that a length of the spot of the laser beam in the second direction is longer than a length of the spot of the laser beam in the first direction, the position adjustment method for the scanning probe microscope comprising:

moving the detection unit such that at least a part of the spot of the adjusted laser beam is included in the light receiving surface; and moving the detection unit such that the spot of the laser beam is located at a center of the light receiving surface.

In the position adjustment method for the scanning probe microscope according to clause 8, the time required for adjustment of the position of the detection unit can be reduced. In addition, even when the laser spot is not adjusted after adjustment of the position of the detection unit, the sample can be analyzed without sacrificing the accuracy. Therefore, the extra time is not required before analysis of the sample.

(Clause 9) A position adjustment method for a scanning probe microscope according to an aspect, the scanning probe microscope including a cantilever, an irradiation unit and a detection unit, the irradiation unit irradiating the cantilever with a laser beam, the detection unit including a light receiving surface for detecting a spot of the laser beam reflected from the cantilever, the position adjustment method for the scanning probe microscope comprising:

adjusting the laser beam such that a spot diameter of the laser beam is larger than a spot diameter of the laser beam during measurement of properties of a sample;

moving the detection unit such that at least a part of the spot of the adjusted laser beam is included in the light receiving surface;

moving the detection unit in a direction of the spot of the laser beam with respect to the light receiving surface, based on at least the part of the spot of the laser beam included in the light receiving surface; and moving the detection unit such that the spot of the laser beam is located at a center of the light receiving surface.

In the position adjustment method for the scanning probe microscope according to clause 9, the time required for adjustment of the position of the detection unit can be reduced.

While the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A scanning probe microscope comprising:
a cantilever having a probe at a tip thereof;
an irradiation unit that irradiates the cantilever with a laser beam;
a detection unit including a light receiving surface for receiving the laser beam reflected from the cantilever, the detection unit detecting a spot of the laser beam on the light receiving surface;
a driving unit that adjusts a position of the detection unit;
a measurement unit that measures properties of a sample based on displacement of the cantilever calculated from displacement of the spot of the laser beam on the light receiving surface; and
a laser beam adjustment unit that adjusts the laser beam applied to the cantilever, wherein
assuming that a direction of displacement of the spot of the laser beam on the light receiving surface when the cantilever is displaced during measurement of the properties of the sample is defined as a first direction, and a direction orthogonal to the first direction on the light receiving surface is defined as a second direction, the laser beam adjustment unit adjusts the laser beam such that a length of the spot of the laser beam in the second direction during adjustment of the position of the detection unit is longer than a length of the spot of the laser beam in the first direction during measurement of the properties of the sample.

2. The scanning probe microscope according to claim 1, wherein
the laser beam adjustment unit adjusts the laser beam such that the length of the spot of the laser beam in the first direction during adjustment of the position of the detection unit is equal to the length of the spot of the laser beam in the first direction during measurement of the properties of the sample.

3. The scanning probe microscope according to claim 2, further comprising
a driving control unit that controls the driving unit, wherein
when at least a part of the laser beam enters the light receiving surface during adjustment of the position of the detection unit, the driving control unit moves the detection unit such that the laser beam enters a center of the light receiving surface.

4. The scanning probe microscope according to claim 1, wherein
the laser beam adjustment unit adjusts the laser beam such that the length of the spot of the laser beam in the first direction during adjustment of the position of the detection unit is longer than the length of the spot of the laser beam in the first direction during measurement of the properties of the sample.

5. The scanning probe microscope according to claim 4, further comprising
a driving control unit that controls the driving unit, wherein
when at least a part of the laser beam enters the light receiving surface during adjustment of the position of the detection unit, the driving control unit moves the detection unit such that the laser beam enters a center of the light receiving surface.

6. The scanning probe microscope according to claim 1, further comprising
a driving control unit that controls the driving unit, wherein
when at least a part of the laser beam enters the light receiving surface during adjustment of the position of the detection unit, the driving control unit moves the detection unit such that the laser beam enters a center of the light receiving surface.

7. A scanning probe microscope comprising:
a cantilever having a probe at a tip thereof;
an irradiation unit that irradiates the cantilever with a laser beam;
a detection unit including a light receiving surface for receiving the laser beam reflected from the cantilever, the detection unit detecting a spot of the laser beam on the light receiving surface;
a driving unit that adjusts a position of the detection unit;
a measurement unit that measures properties of a sample based on displacement of the cantilever calculated from displacement of the spot of the laser beam on the light receiving surface; and
a laser beam adjustment unit that adjusts the laser beam applied to the cantilever, wherein
assuming that a direction of displacement of the spot of the laser beam on the light receiving surface when the cantilever is displaced during measurement of the properties of the sample is defined as a first direction, and a direction orthogonal to the first direction on the light receiving surface is defined as a second direction, the laser beam adjustment unit adjusts the laser beam such that a length of the spot of the laser beam in the second direction is longer than a length of the spot of the laser beam in the first direction.

8. A scanning probe microscope comprising:
a cantilever having a probe at a tip thereof;
an irradiation unit that irradiates the cantilever with a laser beam;
a detection unit including a light receiving surface for receiving the laser beam reflected from the cantilever, the detection unit detecting a spot of the laser beam on the light receiving surface;
a driving unit that adjusts a position of the detection unit;
a measurement unit that measures properties of a sample based on displacement of the cantilever calculated from displacement of the spot of the laser beam on the light receiving surface; and
a laser beam adjustment unit that adjusts the laser beam applied to the cantilever, wherein
the laser beam adjustment unit adjusts the laser beam such that a spot diameter of the laser beam during adjustment of the position of the detection unit is larger than a spot diameter of the laser beam during measurement of the properties of the sample.

9. A position adjustment method for a scanning probe microscope,
the scanning probe microscope including a cantilever, an irradiation unit and a detection unit,
the irradiation unit irradiating the cantilever with a laser beam,
the detection unit including a light receiving surface for detecting a spot of the laser beam reflected from the cantilever,
assuming that a direction of displacement of the spot of the laser beam on the light receiving surface during measurement of properties of a sample is defined as a first direction, and a direction orthogonal to the first direction on the light receiving surface is defined as a second direction, the laser beam being adjusted such that a length of the spot of the laser beam in the second direction during adjustment of a position of the detection unit is longer than a length of the spot of the laser beam in the first direction during measurement of the properties of the sample,
the position adjustment method comprising:
moving the detection unit such that at least a part of the spot of the adjusted laser beam is included in the light receiving surface; and
moving the detection unit such that the spot of the laser beam is located at a center of the light receiving surface.

10. A position adjustment method for a scanning probe microscope,
the scanning probe microscope including a cantilever, an irradiation unit and a detection unit,
the irradiation unit irradiating the cantilever with a laser beam, the detection unit including a light receiving surface for detecting a spot of the laser beam reflected from the cantilever, assuming that a direction of displacement of the spot of the laser beam on the light receiving surface during measurement of properties of a sample is defined as a first direction, and a direction orthogonal to the first direction on the light receiving surface is defined as a second direction, the laser beam being adjusted such that a length of the spot of the laser beam in the second direction is longer than a length of the spot of the laser beam in the first direction, the position adjustment method comprising:

moving the detection unit such that at least a part of the spot of the adjusted laser beam is included in the light receiving surface; and moving the detection unit such that the spot of the laser beam is located at a center of the light receiving surface.

11. A position adjustment method for a scanning probe microscope, the scanning probe microscope including a cantilever, an irradiation unit and a detection unit, the irradiation unit irradiating the cantilever with a laser beam, the detection unit including a light receiving surface for detecting a spot of the laser beam reflected from the cantilever, the position adjustment method comprising:

adjusting the laser beam such that a spot diameter of the laser beam is larger than a spot diameter of the laser beam during measurement of properties of a sample;

moving the detection unit such that at least a part of the spot of the adjusted laser beam is included in the light receiving surface; and moving the detection unit such that the spot of the laser beam is located at a center of the light receiving surface.

* * * * *